(12) United States Patent
Cecala et al.

(10) Patent No.: US 7,147,361 B2
(45) Date of Patent: Dec. 12, 2006

(54) METHODS FOR INJECTING DRY BULK AMENDMENTS FOR WATER AND SOIL TREATMENT

(75) Inventors: Randal G. Cecala, St. George, UT (US); David R. Anson, Bakersfield, CA (US)

(73) Assignee: Wastewater Solutions, Inc, Bakersfield, CA (US)

( * ) Notice: Subject to any disclaimer, the term of this patent is extended or adjusted under 35 U.S.C. 154(b) by 0 days.

(21) Appl. No.: 10/994,095

(22) Filed: Nov. 19, 2004

(65) Prior Publication Data

US 2005/0088909 A1    Apr. 28, 2005

Related U.S. Application Data

(63) Continuation of application No. 10/324,427, filed on Dec. 19, 2002, now Pat. No. 6,979,116.

(60) Provisional application No. 60/408,692, filed on Sep. 5, 2002, provisional application No. 60/407,366, filed on Aug. 30, 2002.

(51) Int. Cl.
*B01F 3/12* (2006.01)

(52) U.S. Cl. ............. 366/132; 366/152.4; 366/153.1

(58) Field of Classification Search ............. 366/114, 366/141, 131–134, 151.1, 152.1, 152.2, 152.4, 366/152.6, 153.1, 160.2, 162.1, 167.1, 181.1, 366/181.3, 183.1, 293–296, 155.1–158.4
See application file for complete search history.

(56) References Cited

U.S. PATENT DOCUMENTS

| | | | | |
|---|---|---|---|---|
| 3,186,602 A | * | 6/1965 | Ricciardi | 222/161 |
| 3,439,836 A | * | 4/1969 | Ricciardi | 222/240 |
| 3,957,253 A | * | 5/1976 | Barton et al. | 366/132 |
| 4,154,372 A | * | 5/1979 | Ricciardi | 222/238 |
| 4,194,844 A | * | 3/1980 | Walling | 366/156.2 |
| 4,201,484 A | * | 5/1980 | Sasiela et al. | 366/153.1 |
| 4,286,883 A | * | 9/1981 | Johanson | 366/137 |
| 4,397,561 A | * | 8/1983 | Strong et al. | 366/21 |
| 4,428,535 A | * | 1/1984 | Venetucci | 241/35 |
| 4,436,429 A | * | 3/1984 | Strong et al. | 366/2 |
| 4,474,476 A | * | 10/1984 | Thomsen | 366/152.4 |
| 4,544,279 A | * | 10/1985 | Rudolph | 366/132 |
| 4,721,448 A | * | 1/1988 | Irish et al. | 425/144 |

(Continued)

FOREIGN PATENT DOCUMENTS

| | | |
|---|---|---|
| DE | 3113200 A1 * | 10/1982 |
| GB | 2338658 A * | 12/1999 |

*Primary Examiner*—Charles E. Cooley
(74) *Attorney, Agent, or Firm*—Mark D. Miller

(57) ABSTRACT

The present invention includes methods for introducing a dry material into a fluid stream in a way that ensures a predictable, highly accurate and consistent application of the material. The invention applies variable amounts of dry material regardless of whether the fluid stream flow rate is fixed or variable. The dry material is handled in dry bulk form and may be highly soluble or nearly insoluble. The dry bulk material is metered before being mixed into a slurry and injected to the fluid stream in a manner that continuously and automatically adjusts the application rate to compensate for varying fluid flow rates or chemical composition, in order to provide a precise fluid treatment level at all times. The present invention allows for the storage of large quantities of the dry process amendment as an integrated and dust-free function of the process. The invention is capable of monitoring and adjusting material levels and introduction rates in real time in response to variations in density, fluid flow rate and/or chemistry composition through the use of one or more sensors and a processor in communication with the metering device.

16 Claims, 5 Drawing Sheets

U.S. PATENT DOCUMENTS

| | | | | |
|---|---|---|---|---|
| 4,812,045 A * | 3/1989 | Rivers | ...................... | 366/107 |
| 4,820,053 A * | 4/1989 | Rivers | ...................... | 366/137 |
| 5,174,651 A * | 12/1992 | Gaddis | ...................... | 366/332 |
| 5,190,374 A * | 3/1993 | Harms et al. | ............ | 366/165.2 |
| 5,213,414 A * | 5/1993 | Richard et al. | ............... | 366/27 |
| 5,222,807 A * | 6/1993 | Gaddis | ...................... | 366/339 |
| 5,344,619 A * | 9/1994 | Larwick et al. | ............. | 422/261 |
| 5,417,491 A * | 5/1995 | Hornung et al. | ............ | 366/134 |
| 5,468,066 A * | 11/1995 | Hammonds | ................. | 366/139 |
| 5,570,953 A * | 11/1996 | DeWall | ..................... | 366/10 |
| 5,573,333 A * | 11/1996 | Dahlman | .................... | 366/132 |
| 5,580,168 A * | 12/1996 | Alireza et al. | ........... | 366/153.1 |
| 5,628,563 A * | 5/1997 | Fisher | ....................... | 366/270 |
| 5,641,410 A * | 6/1997 | Peltzer | ...................... | 210/739 |
| 5,681,109 A * | 10/1997 | Palmer | .................... | 366/167.1 |
| 5,765,945 A * | 6/1998 | Palmer | .................... | 366/167.1 |
| 5,913,602 A * | 6/1999 | Steele | ....................... | 366/132 |
| 5,951,161 A * | 9/1999 | Blagg | ..................... | 366/152.6 |
| 5,976,212 A * | 11/1999 | Hartmann | ...................... | 71/55 |
| 6,036,740 A * | 3/2000 | Miller et al. | ................... | 71/32 |
| 6,039,470 A * | 3/2000 | Conwell | ..................... | 366/137 |
| 6,120,173 A * | 9/2000 | Bonissone et al. | ............. | 366/8 |
| 6,247,838 B1 * | 6/2001 | Pozniak et al. | ............. | 366/136 |
| 6,739,747 B1 * | 5/2004 | Millward | ................. | 366/167.1 |
| 6,979,116 B1 * | 12/2005 | Cecala et al. | ............... | 366/132 |
| 2005/0024988 A1 * | 2/2005 | Hoff et al. | ................... | 366/141 |

* cited by examiner

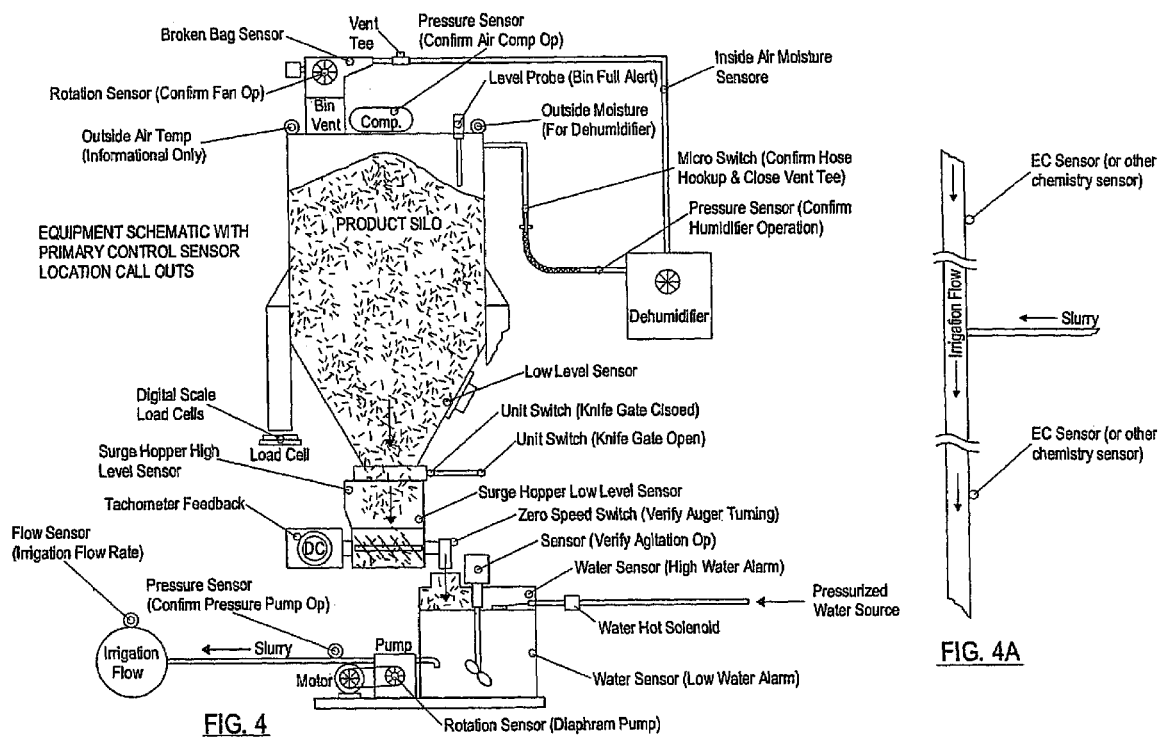

METHODS FOR INJECTING DRY BULK AMENDMENTS FOR WATER AND SOIL TREATMENT

This application is a continuation of application number 10/324,427 (now U.S. Pat. No. 6,979,116) filed on Dec. 19, 2002. which claims the benefit of U.S. Provisional Application No. 60/407,366 filed on Aug. 30, 2002, and U.S. Provisional Application No. 60/408,692 filed on Sept. 5, 2002, all of which are incorporated herein by this reference.

BACKGROUND OF THE INVENTION

1. Field of the Invention

This invention pertains generally to water amendment technology as it relates to altering the characteristics of a fluid stream to maintain a consistent mixture in the stream. In particular, the present invention is a substantial improvement to the process of amending irrigation water to ultimately improve soil and growing conditions in agricultural/ turf applications by providing an engineered delivery system that incorporates an integral and unique dry bulk feed system, an automated variable-rate discharge capability, and an apparatus which may be easily integrated into an environment that requires more sophisticated controls than present art by incorporating a high level of automation.

For more than two decades, amendments have been applied directly to soil by hand, or by mechanical spreaders, as a means of improving soil structure and plant health. In more recent times, surface spreading has become less desirable in many applications due to dust concerns, semi-permanent irrigation lines, the presence of crops, soil compaction, labor cost, public perception and other such issues. Independent laboratory and university studies have indicated that soil will always take on the characteristics of the water it is irrigated with. Therefore, where feasible and desirable, an alternative to surface application is to amend the irrigation water itself. Better irrigation water results in better soil structure, and ultimately improves overall growing conditions similar to, and in some ways better than, traditional surface applications.

A particular focus of the present invention is in the turf area of agricultural industry. Golf courses, for example, are large users of irrigation water. With fresh water becoming increasingly more scarce, conservation measures are reaching the point of forcing golf courses, sports fields, parks and other "green" industry users to irrigate with effluent water. Wastewater treatment plants are highly regulated by governmental agencies that require and provide the guidance for treating all wastewater to the point that it meets minimum public safety and health standards. However, there is no legislation that requires effluent water to meet any further quality guidelines when the discharge is used for irrigation (as opposed to being simply discharged back into a river, lake or ocean).

The problem created is that the chemical makeup of straight effluent water often makes for poor irrigation water. Poor water creates poor soil conditions, and users then suffer from unhealthy turf and inefficient water use. Adding gypsum and/or other amendments to the effluent discharge can notably improve its irrigation qualities, making treated wastewater much more viable for use on golf courses and other turf/agricultural environments. Over the last decade, many golf courses, in particular, have attempted to implement a process of dry amendment injection on site. However, the sheer size and capital cost of the specialized equipment necessary to inject dry amendments, such as gypsum, together with the logistics of storage, delivery and handling, have dramatically limited successful implementation on golf course property.

Therefore, it would be particularly advantageous and efficient to inject the amendments directly at the wastewater treatment plant serving the courses, parks, etc. In this manner, a single equipment installation can treat the effluent and improve its irrigation qualities for all of the users downstream. In this fashion, the injection equipment can be installed at a location where other industrial equipment already exists and would therefore be much more appropriate, and it would also eliminate the need for each and every irrigation site being served to own, operate and maintain its own injection equipment. Such a modem industrial application typically requires a high degree of automation and accurate and reliable operation under variable weather and water flow conditions. It is an object of the present invention to fill this need in a way, and to a level that has previously not been attained. Although effluent discharge water is of particular focus, fresh water, (including well, river, runoff, etc.), will often have poor irrigation characteristics as well, and the present invention is equally suited to treating any and all sources of irrigation water without limitation.

2. Description of the Prior Art

In recent years, several inventions have been designed to introduce gypsum and other dry amendments directly into irrigation water. U.S. Pat. Nos. 4,820,053 and 5,417,491 represent the most common systems in use in the agricultural/turf industry. U.S. Pat. Nos. 5,628,563, 5,765,945 and 5,681,109 represent similar devices in function. The object of all such current inventions focus on differing methods of mechanically or hydraulically blending dry amendments (e.g., gypsum), with a liquid (typically water), in an integral mixing vat or container, and then introducing the resulting slurry into irrigation water in some sort of controlled fashion.

In each case, the injection machine acts as the metering device, with the effective treatment rate determined and preset manually for each particular installation. Common methods of metering with present art are through the use of an orifice disc, mechanical screen(s), adjusting the slurry output flow rate, pre-loading a certain quantity of amendment, blending the slurry output with makeup water or other such means of restricting and/or controlling the amount of slurry as it is discharged from an integral mixing tank or container into the irrigation flow. Precision of the application rate using any of these, or other similar methods, is marginal at best.

Regardless of how it is metered, the appropriate amount of gypsum or any amendment to be injected in any given scenario is a function of the irrigation water flow rate in gallons per minute ("GPM"), in relation to the desired treatment level (typically expressed in milliequivalents per liter ("Meq/L") or parts per million, ("PPM")). In a typical agricultural environment, irrigation pumps are either on or off, meaning the flow rate is a known constant whenever the pump is operating, thus allowing present art to operate in an acceptable fashion given its limitations. In many installations, however, golf courses and wastewater treatment plants for example, the irrigation water flow can vary greatly and change rapidly. This means that a mechanically fixed rate of injection would either under-apply, or worse, over-treat the irrigation water.

For example, if gypsum is injected at rate in excess of what the water can scientifically absorb, it will not dissolve into solution and will instead precipitate out causing accelerated equipment wear and tear, and will begin clogging emitters, sprinklers and possibly the irrigation delivery system itself. Even with a fairly constant flow rate, natural water chemistry can still vary enough that frequent modification of the injection rate may be desirable to more precisely maintain a desired treatment level. Attempts to operate existing systems in applications of frequent and/or rapid changes in irrigation water flow rate or chemistry have been impractical or failed altogether, and is thus a particular focus and advantage of the present invention.

The holding capacity for the dry process material in existing systems is also necessarily limited to the capacity of the mixing tank or container (three tons or less is common). This requires refilling of the mixing tank/container manually by workmen who must dump in large quantities of bagged product, or by some other means of frequently refilling the injection machine. This can be expensive, labor intensive, inefficient and very undesirable in many applications. For example, at a golf course where irrigation occurs throughout the evening hours when no workman would typically be on duty. Further, as the machines are refilled or "charged," the actual treatment rate is subject to great variation including complete stoppage. The present invention provides the means for true, continuous operation without interruption.

In some applications, a bulk storage silo has been situated near an injection machine to reduce the manual labor by using a common convey auger to dispense amendments from the storage silo directly into the mixing tank. These installations, however, have many limitations and fail to achieve the advantages of the present invention. As an adjunct, the storage silos are not engineered as an integral part of the injection process, and are therefore prone to process failures. Bridging, inconsistent or unreliable delivery, excessive dust emissions and high maintenance are common examples of defects.

For example, the most common form of bulk storage silos, including those currently used in conjunction with injection machines in the agricultural/turf industry, are of the standard "funnel flow" type. That is to say that the stored product will flow downward from the middle of the silo, leaving the outer product in place until the middle falls so far down that the outer material falls into the center void, creating the funnel effect. (Imagine how sand flows in an hourglass.) While dry bulk materials tend to flow freely when perfectly dry, they can become "sticky" when moisture is present. This causes amendments such as gypsum to J "bridge" in a generic, funnel flow silo, even with only a trace of excess free moisture. (Bridging means that a hollow void or cave is created near the bottom of the hopper, preventing any material from discharging.) This bridging phenomenon is further aggravated and magnified when a standard convey auger has been employed and has been slowed down in an attempt to provide for a metering function.

Excess free moisture will also cause certain dry amendments to adhere to the sidewalls of a storage silo, where it can then build up to several inches thick, eventually falling off in large chunks, restricting or even completely stopping product flow by clogging the small discharge opening at the bottom of the silo hopper. Any material adhesion increases the propensity of bridging and prevents uniform process flow as well. Such undesirable flow problems are common and unavoidable with existing systems, especially when operating in areas of high rainfall and/or high humidity (e.g. coastal regions). Due to its ultra fine grind and hygroscopic nature, ambient moisture is especially problematic when handling solution grade gypsum, which is the most common dry amendment injected in irrigation water applications.

Even without moisture, existing systems which employ a generic silo and standard convey auger to attempt a metering function are defective in other ways. For example, the flow characteristics of a standard bulk storage silo inherently dispenses product with varying bulk density. In addition, dry bulk materials are in and of themselves prone to widely varying bulk density, based on such elements as ambient air temperature, humidity, aeration, crystalline structure, particle size distribution and purity. A fixed or constant auger speed, as is the common practice in all known agricultural applications, does not compensate for changes in bulk density and the discharge volume is then subject to great variation, failing to achieve a uniform and accurate application rate. The present invention addresses all of these limitations by incorporating an integral storage silo featuring a product-specific "mass flow" design hopper, an automated variable-rate precision feed mechanism, and air-drying capability to control humidity inside the silo.

Another common defect with existing art is the lack of modem and remote automation of the entire process. Existing systems were clearly designed for primary use in a farm environment where extensive automation would be cost prohibitive and/or unnecessary. The present invention addresses the needs of more demanding environments, such as a wastewater treatment plant or other industrial facility where automated operation, control and monitoring is essential to integration of the injection system with other equipment or processes on site.

Lastly, a preferred embodiment of the present invention incorporates all of the necessary apparatus to carry out the entire treatment process, including the advantage of using dry powder amendments purchased in bulk form, in a single, integrated, protected and distinctly compact arrangement that prevents malfunction due to outside forces such as weather, unauthorized tampering or petty vandalism.

SUMMARY OF THE INVENTION

The present invention comprises an apparatus and method for introducing a dry material into a fluid stream in a way that ensures a predictable, highly accurate and consistent application of the material where the fluid stream may be fixed or variable, where the material is handled and metered in dry bulk form and may be highly soluble or nearly insoluble, and in a manner that continuously and automatically adjusts the application rate to compensate for varying material bulk density, as well as, and in addition to, varying fluid flow rates or chemistry composition, in order to provide a precise dosage rate at all times. The present invention incorporates the necessary means to store large quantities of the dry process amendment as an integrated and dust-free function of the apparatus and process. Application of "solution grade" gypsum to irrigation water is a common application, however the apparatus and process described herein are equally suited to process other dry bulk amendments/fertilizers such as potassium sulfate, ammonium sulfate and other fertilizer compounds available in dry bulk form.

In the method of the present invention, bulk powderous material (dry amendment) is introduced into a holding container of a design such that it will hold an appropriate amount of the dry amendment to allow uninterrupted treatment. A preferred method of filling the container would be by a pneumatic convey system from a bulk transport truck. In this way, the powderous material could be conveyed through a totally enclosed line and vented through a bag house to make the loading process virtually dust free.

The material then flows by gravity downward through a flow control gate and into a precision feed mechanism. This mechanism first conditions the powder into a more uniform and homogenous bulk density. Then, a separate precision feed auger discharges the conditioned powder at varying speeds. The speed of the feed auger is varied by means of a variable speed drive (VSD) motor continuously adjusted by a programmable logic controller (PLC) or similar computerized device in order to meter the appropriate volume of dry amendment before introduction to fluid to consistently maintain the desired irrigation water treatment level, even with frequent and rapidly varying irrigation water flow rates.

The precision feed mechanism discharges the pre-measured amount of dry powder into a vat of liquid (typically water), where the powder is blended with the liquid by vigorous agitation to create a thin-bodied and uniform slurry. The slurry is then withdrawn from the vat and injected by means of a pump for injection into irrigation water. The metering process is performed in the dry bulk stage, thus overcoming the restrictions and limitations of prior art which adjust the application rate by metering the final slurry as it is withdrawn from a mixing tank or container.

The apparatus of the present invention includes a bulk silo that is typically of a size large enough to store in excess of one full truckload of the desired dry amendment. It is equipped with a means to allow the filling of the silo by a pneumatic convey system and incorporates an integral bin vent which allows the pressurized air to exhaust to atmosphere with virtually no dust escaping. A preferred embodiment of the silo would be a round, mass-flow design, where the diameter, shape, configuration and hopper angles are all scientifically formulated to prevent bridging and allow the uniform, first-in-first-out flow of a specific dry amendment. A flow control valve situated at the bottom of the hopper opens and closes as necessary to prevent flooding as gravity feeds the material down into a volumetric feeder.

The volumetric feeder consists of four main components. First, a small supplemental hopper receives the incoming dry material from the storage silo above. The supplemental hopper provides the means for the physical transition from the shape and dimensions of the flow control valve, down to the input shape and dimensions of the housing containing the conditioning and precision feed augers. The supplemental hopper also holds enough dry amendment to allow the main storage silo above to be isolated from the feed system during the refilling procedure in order to prevent excess air pressure from the pneumatic conveyor from disturbing the uniform density of the feed input material, thus allowing the treatment process to continue uninterrupted during refilling. Second, the volumetric feeder itself incorporates an intromitter which rotates around the metering feed screw, conditioning the dry amendment into a uniform bulk density to allow for precision volume output. Third is the metering feed screw itself which actually conveys the conditioned product to a discharge point above the fluid mixing tank. Fourth, a variable speed drive (VSD) motor turns the feed screw at varying RPMs in order to meter out the appropriate volume of amendment required for a given application. One or more flow meters or chemistry sensors mounted in the flow of irrigation water send electronic signals to a PLC or similar device, which then automatically and continuously controls the rotation speed of the variable speed motor, causing the metering auger to automatically adjust the discharge rate to consistently maintain a programmed treatment level in direct relation to the irrigation flow rate or chemistry composition.

The fluid mixing tank is of convenient size and shape such that it provides an appropriate volume of liquid for the amendment to completely dissolve or go into suspension before discharge. A float or other flow control device allows the continuous introduction of makeup fluid to maintain a given fluid level inside the mixing tank. A diaphragm-type pump withdraws the homogenous slurry from the mixing tank and then injects it into the irrigation water flow.

It is therefore a primary object of the present invention to provide an improved automated method and apparatus for introducing controlled and consistent levels of dry amendments into irrigation water for application to soils.

It is also a primary object of the present invention to provide a method and apparatus for maintaining a desired level of fluid treatment by metering the introduction of a dry amendment in the dry bulk stage before it is mixed with the fluid, instead of metering the introduction of a mixed slurry containing the amendment as it is withdrawn from a mixing tank.

It is also an important object of the present invention to provide a method and apparatus that is capable of establishing and maintaining a uniform and accurate application rate of a dry amendment that is mixed into irrigation water.

It is also an important object of the present invention to provide a method and apparatus for introducing a dry material into a fluid stream that is capable of compensating for fluctuations and variations in the fluid flow rate, as well as fluctuations and variations in the density and discharge volume of the dry material.

It is also an important object of the present invention to provide a method and apparatus for introducing a dry material into a fluid stream that is capable of compensating for bridging of the dry material caused by moisture in order to maintain a uniform and accurate application rate of the dry material.

It is another important object of the present invention to provide a method and apparatus for introducing a dry amendment into a fluid stream that has a large storage capacity for holding the dry amendment and is capable of continuous operation while the storage is being refilled.

It is another important object of the present invention to provide a method and apparatus for introducing a dry amendment into a fluid stream having an integral storage silo featuring a product-specific mass-flow design hopper, an automated variable-rate precision feed mechanism, and an air-drying capability to control humidity inside the silo.

It is also an object of the present invention to provide a method and apparatus for introducing a dry amendment into a fluid stream in which the speed of the dry amendment feed auger may be varied by means of a continuous and automated method controlled by a PLC or similar computerized device in order to meter the appropriate volume of dry amendment before introduction to fluid so as to consistently maintain the desired fluid treatment level.

It is also an object of the present invention to provide a method and apparatus for introducing a dry amendment into a fluid stream having a amendment storage hopper the size, shape and dimensions of which are determined by scientific testing of the cohesive properties, wall friction characteristics and bulk density/pressure (compressibility) of the specific amendment to be processed so as to provide an amendment-specific storage hopper for more uniform flow and density of the dry bulk amendment.

It is another object of the present invention to provide a method and apparatus for introducing a dry amendment into a fluid stream using technology to monitor and automatically adjust the dry bulk injection process in real time based on the frequently calculated actual bulk density of the dry amendment.

It is another object of the present invention to provide a method and apparatus for introducing a dry amendment into a fluid stream using technology to monitor and automatically adjust the dry bulk injection process in real time based on the fluid flow rate or chemical composition.

It is another object of the present invention to provide a method and apparatus for metered introduction of gypsum or other dry soil amendments into irrigation or recycled waste water for application to soils.

Additional objects of the invention will be apparent from the detailed description and the claims herein.

BRIEF DESCRIPTION OF THE DRAWINGS

FIG. 1A is a pictorial diagram of an alternative embodiment utilizing a pair of sensors in the fluid stream.

FIG. 4 shows preferred sensor identification and approximate locations necessary for automating the amendment injection process.

FIG. 4A is a pictorial diagram of an alternative embodiment utilizing a pair of sensors in the fluid stream.

DETAILED DESCRIPTION OF A PREFERRED EMBODIMENT

Figure 1:
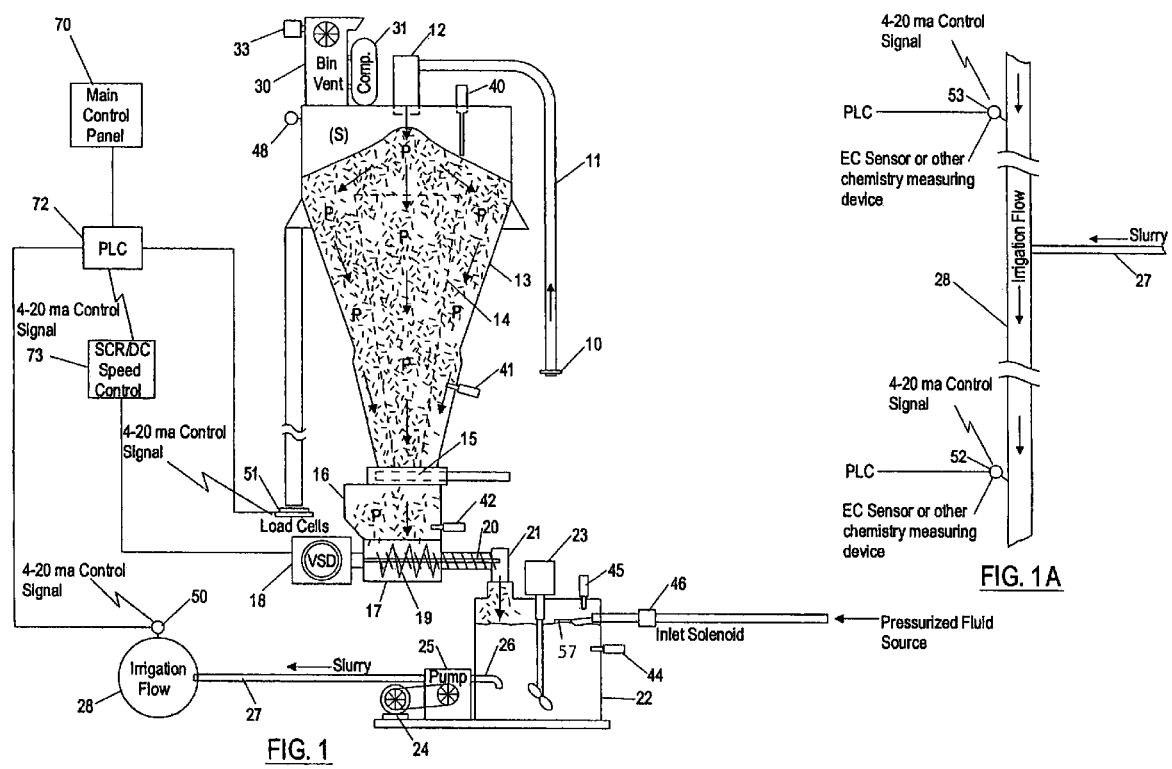
FIG. 1 is a pictorial diagram of the process and a preferred embodiment of the present invention.

Referring to the drawings wherein like reference characters refer to the same or corresponding structures throughout the several views, and referring particularly to FIG. 1 and FIG. 4 it is seen that the present invention includes an apparatus and means to process and meter a dry bulk amendment, introduce the dry material into a fluid medium, and inject the resultant slurry into a fluid flow or system. While the system described and illustrated in the appended drawings refers to a water or waste water flow used for soil irrigation purposes, it is to be appreciated that the method and apparatus of the present invention may be adapted for and used in a wide variety of commercial, industrial and/or agricultural applications.

A means for storage and process delivery of dry bulk amendments is provided by a silo S incorporating a mass flow design consisting generally of an outer silo or hopper 13 which is typically, although not necessarily, of a size and shape so as to conveniently receive and store an entire truckload of bulk product. In some applications a separate inner hopper 14 may also be provided. The design of both the outer 13 and inner 14 hopper(s) (as applicable), are specifically mass flow engineered to provide true, first-in-first-out free-flow of a particular dry amendment, with consistent bulk density and without bridging, under almost all conditions. The actual hopper design will vary and is determined by scientific testing of the cohesive properties, wall friction characteristics and bulk density/pressure (compressibility) of the specific amendment to be processed. The results of these tests are then used to engineer the exact silo and hopper dimensions/angles by personnel skilled in this field.

A means of filling the storage silo S is provided for by a standard pressure hose fitting 10 and fill tube 11, allowing bulk delivered product P to be pneumatically conveyed up and into target box 12, which redirects the product downward into the storage silo S at a point near the center. In an alternative embodiment (not shown), fill tube 11 may extend above the eave of the silo to a height where it can be connected directly into the top of the silo 5, eliminating the need for target box 12. A bag house-type bin vent 30 is employed on the roof of the silo S in such a way that excess air may escape the confines of the silo and vent to atmosphere with virtually no entrained dust. An air compressor 31 supplies the necessary compressed air to pulse clean the bin vent bags using a pulse timer 33. A bin full sensor 40 is installed to sound an alarm when the silo reaches maximum capacity. Similarly, a low level sensor 41 is situated at a point near the bottom of the hopper to signal when the silo level is low.

The dry amendment flows by gravity from storage hopper(s) 13 (and 14, when applicable), through a pneumatically controlled flow control valve 15, attached to the bottom of the outer silo/hopper. Control valve 15 functions primarily to isolate the storage area from the rest of the process as necessary to keep excess air pressure, such as that often experienced during the pneumatic refilling process, from abruptly changing bulk density and disturbing the uniform flow of material P into the volumetric feeder 17 below. Valve 15 may also be employed to stop product flow for maintenance reasons. Compressor 31 provides the compressed air to operate the control valve 15. In an alternative embodiment (not shown), a separate manually-controlled gate may be installed in conjunction with the pneumatic valve 15 for additional ease of maintenance of all of the components situated below it.

A smaller supplemental feed or surge hopper 16, having a preferred capacity of approximately 0.15% of the overall volume of silo S (e.g., approximately two cubic feet), is attached under flow control valve 15. Supplemental hopper 16 is sized to hold enough of the dry product P to allow the continued operation of the treatment process for a sufficient period of time as to allow control valve 15 to be closed while the silo S is being refilled, or at least until the product in the storage silo increases to a level that the valve may reopen without disturbance to the feed system from air pressure in the silo from the refilling process. Product level sensor 41 is also incorporated to signal the automatic open-close operation of flow control valve 15. When the level of product P drops below sensor 41, valve 15 automatically closes during delivery of additional product into silo S until that level rises above sensor 41, at which time valve 15 automatically reopens. Additionally, a low level sensor 42 is employed to signal that the supplemental feed hopper 16 is nearly empty and allow for a warning indication that the process is about to run out of dry feed material. Supplemental hopper 16 also allows for the mechanical transition in dimension from the output side of flow control valve 15, to the input side of the volumetric feeder housing 17. The use of such an isolation device to allow uniform and uninterrupted treatment application during recharge or refilling is currently not applied in the field of invention and is another object of the present invention.

Figure 3A:
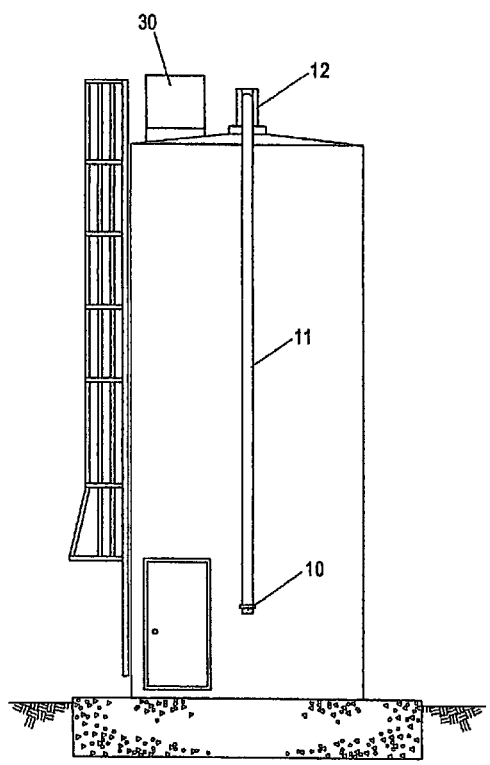
FIG. 3A is an external view an embodiment of the invention.
Figure 3B:
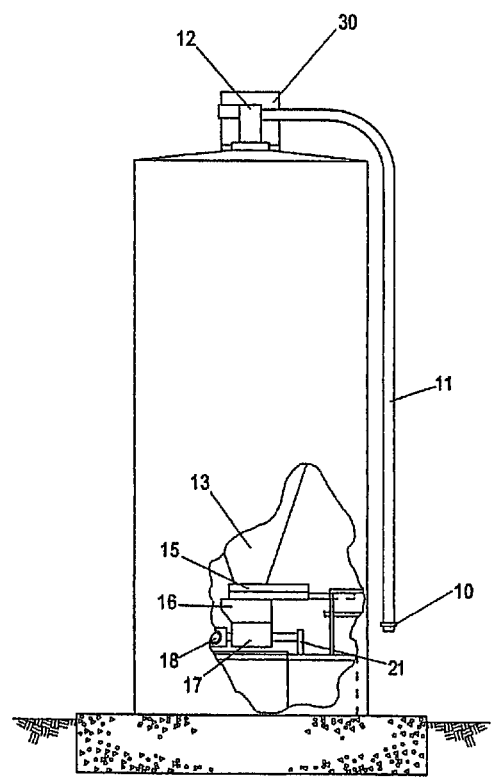
FIG. 3B is a partially cut away view of the embodiment of FIG. 3A.

The volumetric feeder 17 houses an intromitter 19 and a smaller metering auger 20, which are mechanically geared together to create a double concentric auger metering mechanism that conditions dry feed material into a uniform density and provides an exceptionally high degree of output metering accuracy for dry bulk powders. As dry product P flows by gravity from supplemental feed hopper 16 into housing 17, the intromitter 19 thoroughly blends and conditions the product into a uniform bulk density and then "feeds" the smaller metering auger 20 from 360 degrees within housing 17 to further improve conveyance accuracy. An integral gearbox allows a variable speed drive DC motor 18 to simultaneously turn both the intromitter 19 and metering auger 20 at a turndown ratio that may vary according to the application. A typical ratio is approximately 40:1. It is to be appreciated that the silo S. hopper 16, feeder 17, and other related parts of the invention may be provided inside an enclosure to provide protection from weather, and prevent unauthorized access and tampering as shown in FIGS. 3A and 3B.

In operation, PLC 72 receives fluid (e.g. irrigation water) flow rate information from a digital flow meter 50. Using the flow rate (GPM), together with the desired treatment level as indicated by operator input at a main control panel 70, and further based upon preprogrammed parameters for a particular application, the PLC 72 signals an SCR/DC speed controller 73 to adjust the RPM of the volumetric feed motor 18 to continually and automatically discharge the correct volume of product to affect the desired treatment level in relation to actual fluid flow rates in real time. The use of such a precision feed system, together with the ability to automatically adjust the discharge rate of a dry bulk amendment based on fluid flow, is currently not applied in the field of invention and is another object of the present invention.

The horizontal discharge from the volumetric feed system enters an enclosed discharge adapter 21. The discharge adapter 21 mounts to the outlet of the feed mechanism discharge tube and to the inlet of a mixing tank 22, allowing the dry material to flow by gravity from the feeder 17 into the mixing tank 22 without interference. The generic mixing tank 22 contains a sufficient volume of fluid (typically water) in relation to the type and volume of dry material being introduced, such that a uniform slurry or solution may be achieved. Paddles, propellers, or some other means of agitation is provided to rapidly blend the liquid and dry materials prior to injection. A barrel-type mixer 23, which is comprised of an electric motor, integral drive shaft and a small propeller at the end as shown in FIG. 1, would be sufficient in most cases. An electric motor 24 drives a pump 25 which extracts the resulting slurry/solution frpm the mixing tank 22 via an extraction tube 26 situated approximately midway between the bottom of the mixing tank 22 and the surface of the fluid contained therein. Pump 25, typically a diaphragm-type, then pumps the slurry at a constant flow rate through an injection line 27 where it is introduced into the flow of fluid 28, which may be an irrigation ditch, canal, channel, river, weir, pipe or any other type of system on conduit.

As the slurry is discharged, makeup fluid is simultaneously and proportionally introduced into mixing tank 22 to maintain a given fluid level. To accomplish this, a pressurized source of fluid is supplied to the mixing tank by means of a common float valve 57. In the, alternative, or in conjunction with a float valve, an electronic solenoid and valve 46 may be used to control the inlet of makeup fluid to maintain a given level inside tank 22. Fluid level sensors, 44 and 45 are employed to signal a malfunction which has allowed the fluid level to fall below, or exceed, respectively, the desired level, and may also be used to control the electronic fill valve 46 as a means of automating the function of maintaining an approximate fluid level without the use of a mechanical float valve.

The present invention makes it possible to optionally provide automated features which further enhance the precision and automation of the injection process by incorporating a means of monitoring the net weight of the bulk amendment in the storage silo S, and applying this information in the process control. In the preferred embodiment, load cells 51 are incorporated to constantly, and very accurately, send net weight information to the PLC 72. In response to preprogrammed logic, the PLC compares the rate at which the dry amendment is declining in relation to the volume of material that should have been dispensed to meet a desired treatment rate, thus further defining the actual bulk density of the dry material and allowing the PLC to fine tune the RPM of meter auger 20 to automatically and continuously compensate for actual, versus calculated, dry bulk density. The availability of continuous weight information also allows the operator to view the volume of product remaining from the main control panel 70 for inventory control purposes. The use of such technology to monitor and adjust the dry bulk injection process in real time and based on actual bulk density, is currently not applied in the field of invention and is another object of the present invention.

Some amendments. alter fluid chemistry by a uniform amount, providing an alternate means to control the amendment application rate. Gypsum, for example, increases the total salinity (salt concentration) of irrigation water by a uniform and calculable amount. Total salinity can be accurately determined and monitored by measuring the electrical conductivity (EC) of water, typically expressed as dS/M. Therefore, another preferred means of automating the water treatment process, together with, or instead of, utilizing product weight information, is to install Electrical Conductivity (EC) sensors or other chemistry measuring devices in the irrigation water flow. In a preferred embodiment shown in FIG. 1, sensor 53 transmits the pre-treatment EC level to PLC 72, and sensor 52 sends the post-treatment EC level. The PLC then compares the two readings and uses the data to adjust the feed auger 20 to increase or decrease RPM as necessary in order to dispense the appropriate amount of amendment needed to maintain a desired treatment level based on the salinity delta. It is to be appreciated that while this example describes the use of salinity to measure changes in chemistry caused by adding the amendment gypsum, the present invention contemplates different analogous chemical comparisons that may be used with different added amendments.

Figure 5:
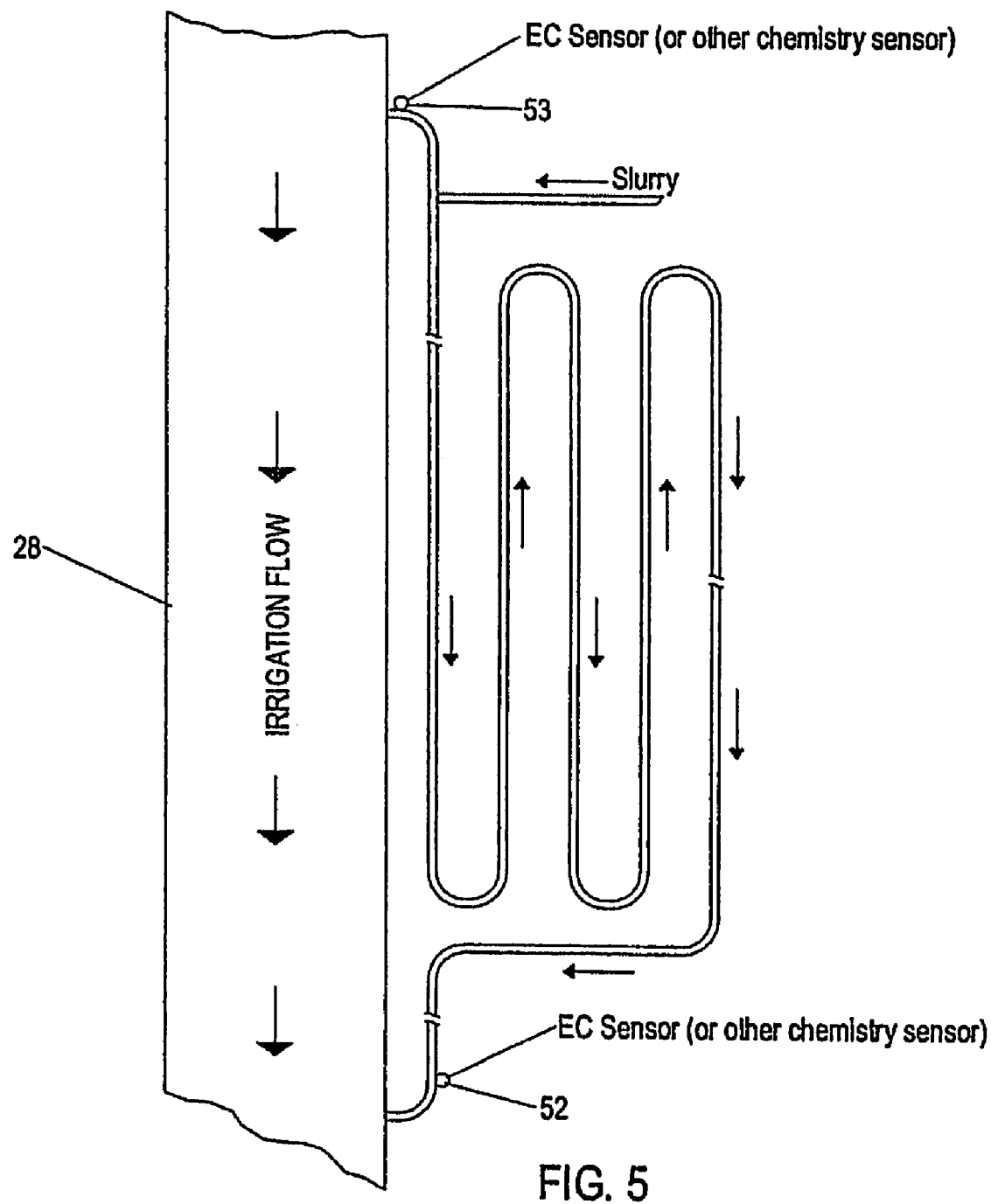
FIG. 5 illustrates an alternate method and apparatus for locating chemistry sensors for operating convenience and efficiency.

Another method would be to use a single sensor 52 downstream from the injection site at a point where the amendment has had sufficient contact time to fully dissolve or go into uniform solution, sending a signal to the PLC or direct to SCR/DC controller 73, which then constantly and automatically adjusts the speed of feed auger 20 to increase or decrease RPM as necessary in order to dispense the appropriate amount of amendment needed to maintain a desired treatment level based on the total salinity. The use of such technology to monitor and adjust the dry bulk water amendment injection process in real time and based on actual irrigation water chemistry, is currently not applied in the field of invention and is another object of the present invention. It should be noted that sensors 52 and 53 may be installed directly in the irrigation flow as illustrated in attached FIG. 1. Alternatively, as illustrated in FIG. 5, a separate branch line may be provided where the sensors are installed. The length of the branch line will depend upon the amendment that is being added and,the amount of time the amendment should be in contact with the fluid to assure appropriate mixing. In the case of gypsum and water, for example, it typically takes approximately two minutes following contact with water for the gypsum to dissolve. Thus, any chemical reading or testing of the gypsum-amended water should take place downstream far enough for two minutes to have passed. This is impractical in many cases, so the branch line of FIG. 5 is provided on site such that the fluid takes the required dissolution time (e.g. two minutes) to pass through the local branch line, at which point it is chemically tested.

Figure 2:
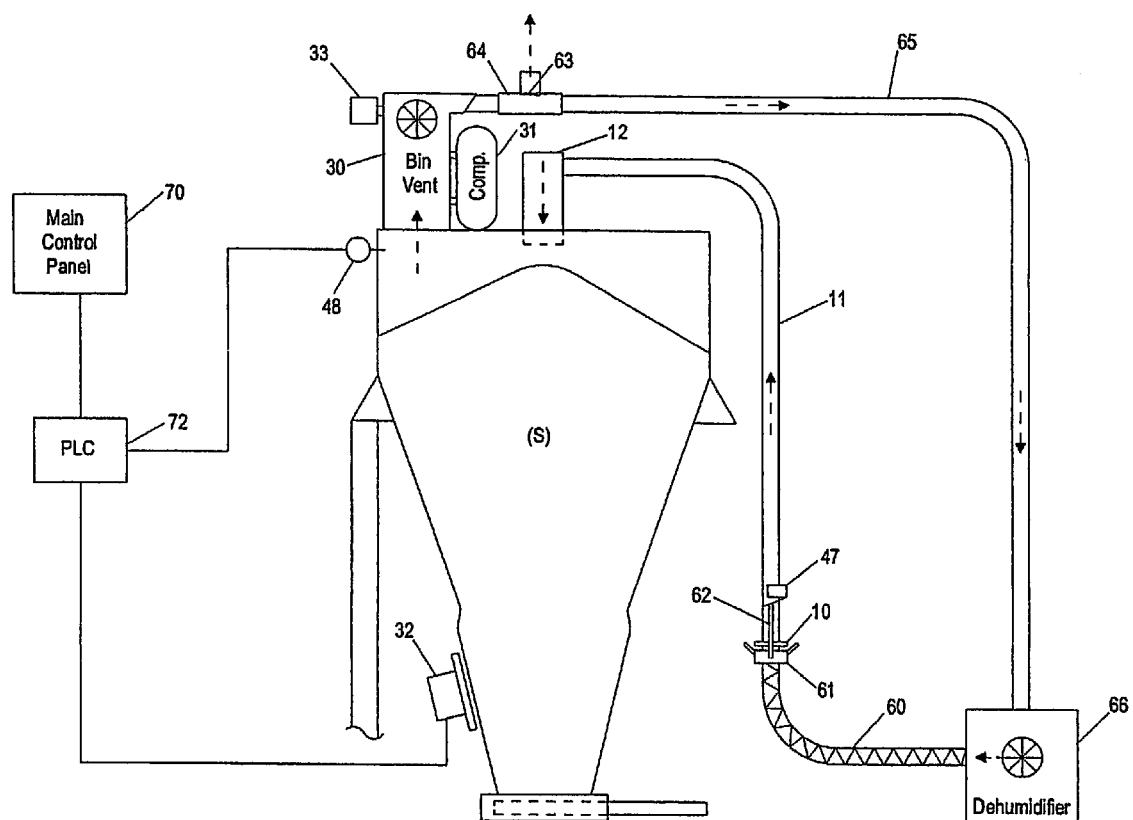
FIG. 2 is a pictorial diagram of an alternative embodiment of the present invention for use in areas of high rainfall and/or high humidity.

The flow characteristics of many dry bulk amendments in powder form change notably when moisture is introduced. Including, and especially, moisture in the form of humid ambient air in the process environment. Finely ground "solution grade" gypsum, for example, is very sensitive to excess free moisture and will usually stop flowing altogether when moist air is present for any prolonged period of time. FIG. 2 illustrates an alternative embodiment of the present invention which can be employed in regions of high rainfall and/or high humidity (e.g. coastal areas). In this application, the process remains the same, but the apparatus is modified to regulate and control the humidity level inside the bulk storage silo S.

In this application, instead of venting the storage silo S to the atmosphere through bin vent 30, a "tee" 64 is mounted to the outlet of bin vent 30. Vent pipe 65 is mounted to one open side of the tee 64, and routed to the inlet side of a dehumidifier 66. Then, by connecting the outlet side of the dehumidifier 66 to the silo fill tube 11, a closed air circuit is formed creating an environment where the ambient moisture (humidity) can be accurately and uniformly controlled. A preferred means of closing the circuit is illustrated, where a flexible hose 60 similar to a pneumatic convey line is attached to the outlet of the dehumidifier 66. At the other end of hose 60, a pneumatic fitting 61 is permanently affixed such that it mates with fitting 10 on fill tube 11. A rigid bar 62 affixed to fitting 61 extends to a point several inches past the union of fittings 61 and 10, where it contacts and engages a limit switch 47. Limit switch 47 then energizes a butterfly or other type valve 63 inside the atmospheric vent tee 64, closing the vent and completing the closed air circulation circuit. This method is preferred because it closes the atmospheric vent tee 64 automatically whenever the dehumidifier is physically connected, and also prevents refilling of the silo with the dehumidifier on line. However, a more permanent, fixed or other alternate means of allowing a closed air circuit to exist would be acceptable. A pressure transducer 48 or other pressure sensing device is employed to ensure that the control valve 63 in atmospheric vent 64 is positioned to allow air inside the silo to vent to atmosphere whenever the dehumidifier is not operating, or when the silo is being refilled. The use of such automation and technology to create an enclosed air circuit and dry the process air inside the storage silo S is currently not applied in the field of invention and is an object of the present invention.

Another optional means to help ensure the proper and continuous product flow out of the storage silo S in regions of high rainfall and/or high humidity, is the application of external vibration to the storage silo in case a bridging condition ever did exist. Once again, weight information from load cells 51, or other such devices to determine the level of product remaining in the storage silo, is used to monitor for a process flow malfunction. If the injection system is actively in operation, and the net dry product weight remains virtually unchanged for a given amount of time, a bridging or flow restriction is determined to exist. The PLC 72 will then energize external mechanical vibrator(s) 32, located at predetermined and engineered location(s) near the bottom of main hopper 13, for a predetermined and calculated time and interval, based upon the particular product and application. Although seemingly insignificant, this feature is of great importance and advantage in that a common mistake in current systems is over-vibrating the hopper, which is known to actually worsen and magnify a bridging condition, and may also dramatically alter the bulk density of the stored product. The use of such automation and precise placement and control over the mechanical process of de-bridging described herein is currently not applied in the field of invention and is another object of the present invention.

It is to be appreciated that a wide variety of different dry materials may be introduced into a fluid stream using the method and apparatus of the present invention, and that different dry materials may also be combined for simultaneous introduction using the present invention.

It is to appreciated that combinations of the features and embodiments other than those specifically described herein may be utilized, depending upon the particular dry amendment to be applied, the particular fluid to which it is to be applied, the quantity and concentration level of the amendment to be applied, the time duration over which the application is to take place, the feasibility of testing the fluid outflow, and other variables or goals.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

The invention claimed is:

1. A method for maintaining a desired level of a material in an external fluid stream comprising the steps of:
   a. introducing fluid under pressure into a mixing tank;
   b. introducing a metered amount of said material in dry form into said mixing tank to form a slurry, the quantity of said dry material introduced being metered in real time according to the flow rate of said external fluid stream such that the concentration of said material in said slurry is varied according to said flow rate;
   c. discharging a continuous volume of said variably concentrated slurry directly into said fluid stream through a line extending between said mixinig tank and said external fluid stream.

2. A method for maintaining a desired level of a material in an external fluid stream comprising the steps of:
   a. introducing fluid under pressure into a mixing tank;
   b. introducing a metered amount of said material in dry form into said mixing tank to form a slurry, and
   c. discharging a continuous volume of said variably concentrated slurry directly into said fluid stream through a line extending between said mixing tank and said external fluid stream, wherein the quantity of said dry material introduced into said tank is metered into said mixing tank according to at least one of the factors selected from the group consisting of: (a) the flow rate of the external fluid stream; (b) the density of the dry material; (c) the chemical composition of the fluid downstream of said discharge; (d) the measured difference in the chemical composition of the external fluid stream before and after said discharge; and (e) combinations thereof.

3. The method of claim 2 comprising the additional step of storing large quantities of said dry material in a silo for metering into said mixing tank.

4. The method of claim 3 comprising the additional step of isolating a portion of said dry material from said silo during refilling.

5. The method of claim 3 comprising the additional step of removing excess moisture from the container thereby preventing absorption by the dry material contained therein.

6. The method of claim 2 comprising the additional step of conditioning the dry material into a uniform bulk density prior to introduction into said mixing tank.

7. The method of claim 2 comnrising the additional steps of introducing fluid under pressure into said mixing tank to maintain a desired level, and mixing said dry material with said fluid in said tank to create a slurry.

8. A method for injecting dry material into an external fluid stream to maintain a desired mixture level in the fluid stream comprising the steps of:
   a. metering dry material at variable rates from a container into a tank that is in communication with a fluid source;
   b. mixing said dry material and fluid from said source in the tank to form a slurry;
   c. maintaining a level of slurry in the tank;
   d. pumping slurry from the tank and introducing it directly to the external fluid stream through a line extending between a said mixing tank and said external fluid stream; and
   e. adjusting the rate of metering of said dry material in accordance with readings from a sensor located in the external fluid stream to vary the concentration of said material in the slurry so as to maintain a desired amount of said material in the external fluid stream.

9. The method of claim 8 wherein said sensor is selected from the group consisting of at least one flow rate sensor and at least one electrical conductivity sensor.

10. The method of claim 8 wherein said sensor is an electrical conductivity sensor located upstream from where said slurry is introduced into said fluid stream.

11. The method of claim 8 wherein said sensor is an electrical conductivity sensor located downstream from where said slurry is introduced into said fluid stream.

12. The method of claim 8 wherein the quantity of said dry material metered into said mixing tank is based on input from at least one of the group consisting of: (a) at least one flow rate sensor, (b) a first chemical sensor associated with said fluid stream upstream of said slurry introduction and a second chemical sensor associated with said fluid stream downstream of said slurry introduction, and (c) a first electrical conductivity sensor associated with said fluid stream upstream of said slurry introduction and a second electrical conductivity sensor associated with said fluid stream downstream of said slurry introduction.

13. The method of claim 8 comprising the additional step of monitoring the quantity of the slurry in the tank by use of a float valve to maintain a constant fluid level.

14. The method of claim 8 comprising the additional step of removing excess moisture from the container thereby preventing absorption by the dry material contained therein.

15. The method of claim 8 comprising the additional step of metering the quantity of dry material in accordance with the actual bulk density of said dry material.

16. The method of claim 8 wherein said container produces a mass flow of the material.

* * * * *